(12) United States Patent
Kim et al.

(10) Patent No.: US 10,349,346 B2
(45) Date of Patent: Jul. 9, 2019

(54) METHOD FOR PROCESSING DATA FOR TERMINAL, IN PSM, IN WIRELESS COMMUNICATION SYSTEM AND DEVICE THEREFOR

(71) Applicant: LG Electronics Inc., Seoul (KR)

(72) Inventors: Laeyoung Kim, Seoul (KR); Jinsook Ryu, Seoul (KR); Hyunsook Kim, Seoul (KR); Jaehyun Kim, Seoul (KR); Taehun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 128 days.

(21) Appl. No.: 15/516,338

(22) PCT Filed: Oct. 1, 2015

(86) PCT No.: PCT/KR2015/010392
§ 371 (c)(1),
(2) Date: Mar. 31, 2017

(87) PCT Pub. No.: WO2016/053028
PCT Pub. Date: Apr. 7, 2016

(65) Prior Publication Data
US 2017/0303195 A1    Oct. 19, 2017

Related U.S. Application Data

(60) Provisional application No. 62/058,653, filed on Oct. 1, 2014.

(51) Int. Cl.
*H04W 52/02* (2009.01)
*H04W 76/20* (2018.01)
(Continued)

(52) U.S. Cl.
CPC ... *H04W 52/0209* (2013.01); *H04W 52/0216* (2013.01); *H04W 52/0229* (2013.01);
(Continued)

(58) Field of Classification Search
CPC ......... H04W 52/0209; H04W 52/0216; H04W 52/0229; H04W 76/20; H04W 76/30;
(Continued)

(56) References Cited

U.S. PATENT DOCUMENTS

2004/0192391 A1* 9/2004 Nagai ............... H04W 16/00
455/561
2011/0085489 A1   4/2011 Rydnell et al.
(Continued)

FOREIGN PATENT DOCUMENTS

| CN | 104053189 A | 9/2014 |
|---|---|---|
| WO | 2011154761 A1 | 12/2011 |
| WO | 2013017032 A1 | 2/2013 |

*Primary Examiner* — Kashif Siddiqui
(74) *Attorney, Agent, or Firm* — Dentons US LLP

(57) ABSTRACT

One embodiment of the present invention relates to a method by which a packet data network-gateway (PGW) processes data for a terminal, in a power saving mode (PSM), in a wireless communication system, the method for processing data for a terminal in PSM, comprising the steps of: receiving a message related to a PDN connection stop request; receiving downlink data which has to be transmitted to a terminal; and performing one of transmission, deletion, and storage of operations of the downlink data on the basis of the message related to the PDN connection stop request.

10 Claims, 7 Drawing Sheets

(51) Int. Cl.
  *H04W 76/25*  (2018.01)
  *H04W 76/27*  (2018.01)
  *H04W 76/30*  (2018.01)
  *H04W 76/38*  (2018.01)

(52) U.S. Cl.
  CPC ........... *H04W 76/20* (2018.02); *H04W 76/27* (2018.02); *H04W 76/30* (2018.02); *H04W 76/38* (2018.02); *H04W 76/25* (2018.02); *Y02D 70/00* (2018.01); *Y02D 70/1224* (2018.01); *Y02D 70/1226* (2018.01); *Y02D 70/1242* (2018.01); *Y02D 70/1262* (2018.01); *Y02D 70/142* (2018.01); *Y02D 70/146* (2018.01); *Y02D 70/21* (2018.01)

(58) Field of Classification Search
  CPC ............... Y02D 70/00; Y02D 70/1224; Y02D 70/1226; Y02D 70/1242; Y02D 70/1262; Y02D 70/142; Y02D 70/146; Y02D 70/21
  See application file for complete search history.

(56) References Cited

U.S. PATENT DOCUMENTS

| | | | |
|---|---|---|---|
| 2012/0039213 A1* | 2/2012 | Cheng | H04W 76/12 370/254 |
| 2012/0236823 A1* | 9/2012 | Kompella | H04W 24/04 370/331 |
| 2013/0064158 A1 | 3/2013 | Sundell et al. | |
| 2015/0327170 A1* | 11/2015 | Kim | H04W 76/18 455/574 |

* cited by examiner

METHOD FOR PROCESSING DATA FOR TERMINAL, IN PSM, IN WIRELESS COMMUNICATION SYSTEM AND DEVICE THEREFOR

This application is a 35 USC § 371 National Stage entry of International Application No. PCT/KR2015/010392, filed on Oct. 1, 2015, which claims the benefit of U.S. Provisional Application No. 62/058,653, filed on Oct. 1, 2014, all of which are hereby incorporated by reference in their entireties as if fully set forth herein.

TECHNICAL FIELD

The present invention relates to a wireless communication system, and more particularly, to a method of processing data for a terminal in PSM and an apparatus therefor.

BACKGROUND ART

Wireless access systems have been widely deployed to provide various types of communication services such as voice or data. In general, a wireless access system is a multiple access system that may support communication of multiple users by sharing available system resources (e.g., a bandwidth, transmission power, etc.). For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a multi carrier frequency division multiple access (MC-FDMA) system.

DISCLOSURE OF THE INVENTION

Technical Task

A technical task of the present invention is to define a method of processing data for a PSM terminal and operations of network nodes related to the method.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method for a PGW (packet data network-gateway) to process data for a UE in a PSM (power saving mode) in a wireless communication system, includes the steps of receiving a message related to a PDN connection pause request, receiving a downlink data to be transmitted to the UE, and performing an operation selected from the group consisting of transmission, deletion, and storage of the downlink data based on the message related to the PDN connection pause request.

To further achieve these and other advantages and in accordance with the purpose of the present invention, according to a different embodiment, a PGW (packet data network-gateway) processing data for a UE in a PSM (power saving mode) in a wireless communication system includes a transceiver and a processor, the processor configured to receive a message related to a PDN connection pause request, the processor configured to receive a downlink data to be transmitted to the UE, the processor configured to perform an operation selected from the group consisting of transmission, deletion, and storage of the downlink data based on the message related to the PDN connection pause request.

The step of performing an operation selected from the group consisting of transmission, deletion, and storage of the downlink data based on the message related to the PDN connection pause request related to the UE can further include the steps of determining whether or not the UE is in the PSM, and if the UE is in the PSM, deleting the downlink data.

The step of performing an operation selected from the group consisting of transmission, deletion, and storage of the downlink data based on the message related to the PDN connection pause request related to the UE can further include the steps of determining whether or not the UE is in the PSM, and if the UE is in the PSM and termination of the PSM of the UE is configured by a value smaller than a predetermined value, storing the downlink data.

The PGW can transmit the downlink data when the PSM is terminated.

The message related to the PDN connection pause request can include at least one of time at which the PSM is initiated and time for which the PSM is maintained.

The message related to the PDN connection pause request related to the UE can be transmitted from an MME when the UE is switched to an idle mode.

The message related to the PDN connection pause request related to the UE can be transmitted from an MME when an active timer starts by a value of active time of the UE.

The active time may correspond to time for which an idle mode is maintained by the UE.

The active time can be allocated to the UE by the MME.

The active time can be included in a TAU accept which is transmitted to the UE by the MME.

If the PSM of the UE is terminated, an uplink packet is generated, or a paused PDN connection-related message is received, the PGW can transmit the downlink data irrespective of the PDN connection pause request.

The PDN connection-related message may correspond to one selected from the group consisting of a modify bearer request, a bearer resource command, and a modify bearer command The PDN connection-related message may not include a PDN connection release-related message and a UE detach-related message.

Advantageous Effects

According to the present invention, if a P-GW receives a packet heading to a UE, which is incapable of receiving the packet because the UE is in a PSM, the P-GW discards or buffers the packet rather than transmits the packet to the UE to prevent an unnecessary message/signaling from being exchanged in a mobile communication system.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incor

BEST MODE

Mode for Invention

Figure 1:
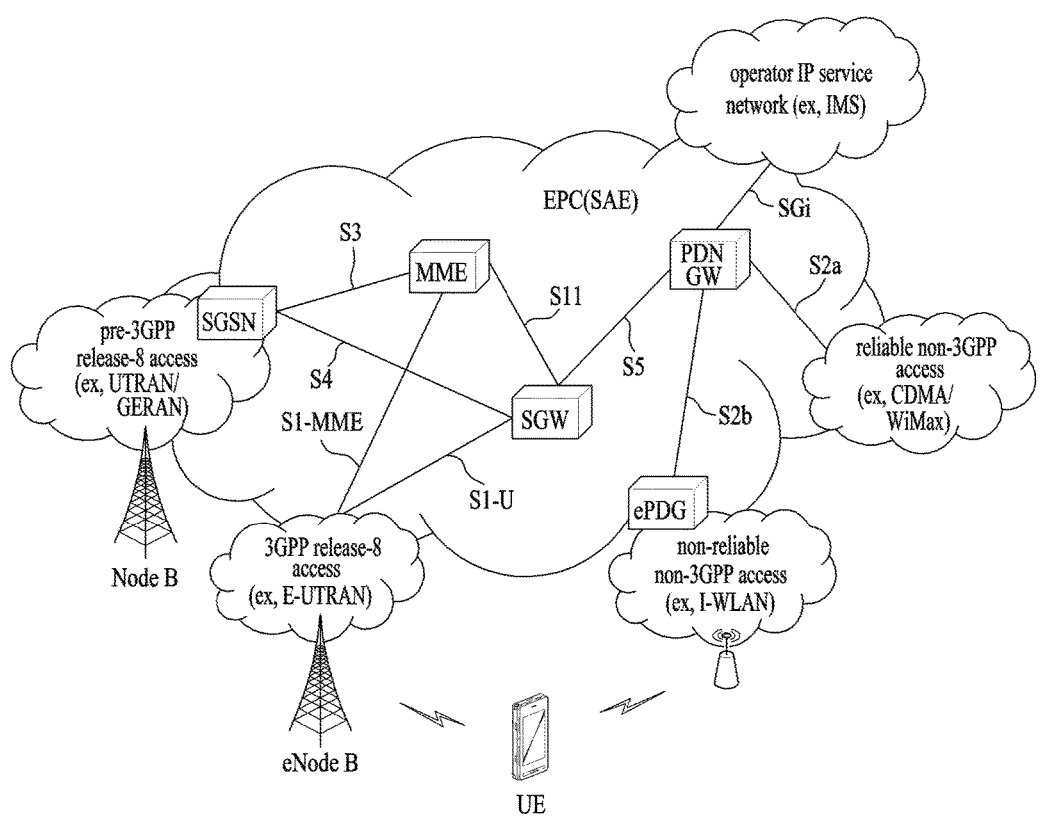
- FIG. 1 is a schematic diagram for an EPS (Evolved Packet System) including an EPC (Evolved Packet Core)

The embodiments below are combinations of components and features of the present invention in a prescribed form. Each component or feature may be considered as selective unless explicitly mentioned as otherwise. Each component or feature may be executed in a form that is not combined with other components and features. Further, some components and/or features may be combined to configure an embodiment of the present invention. The order of operations described in the embodiments of the present invention may be changed. Some components or features of an embodiment may be included in another embodiment or may be substituted with a corresponding component or feature of the present invention.

Specific terms used in the description below are provided to help an understanding of the present invention, and the use of such specific terms may be changed to another form within the scope of the technical concept of the present invention.

In some cases, in order to avoid obscurity of the concept of the present invention, a known structure and apparatus may be omitted, or a block diagram centering on core functions of each structure or apparatus may be used. Moreover, the same reference numerals are used for the same components throughout the present specification.

The embodiments of the present invention may be supported by standard documents disclosed with respect to at least one of IEEE (Institute of Electrical and Electronics Engineers) 802 group system, 3GPP system, 3GPP LTE & LTE-A system and 3GPP2 system. Namely, the steps or portions having not been described in order to clarify the technical concept of the present invention in the embodiments of the present invention may be supported by the above documents. Furthermore, all terms disclosed in the present document may be described according to the above standard documents.

The technolgy below may be used for various wireless commnunciation systems. For clarity, the description below centers on 3GPP LTE and 3GPP LTE-A, by which the technical spirits of the present invention is non-limited.

Terms used in the present document are defined as follows.

UMTS (Universal Mobile Telecommunications System): a GSM (Global System for Mobile Communication) based third generation mobile communication technology developed by the 3GPP.

EPS (Evolved Packet System): a network system that includes an EPC (Evolved Packet Core) which is an IP (Internet Protocol) based packet switched core network and an access network such as LTE and UTRAN. This system is the network of an evolved version of the UMTS.

NodeB: a base station of GERAN/UTRAN. This base station is installed outdoor and its coverage has a scale of a macro cell.

eNodeB: a base station of LTE. This base station is installed outdoor and its coverage has a scale of a macro cell.

UE (User Equipment): the UE may be referred to as terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The term "UE", as used in relation to MTC, can refer to an MTC device.

HNB (Home NodeB): a base station of UMTS network. This base station is installed indoor and its coverage has a scale of a micro cell.

HeNB (Home eNodeB): a base station of an EPS network. This base station is installed indoor and its coverage has a scale of a micro cell.

MME (Mobility Management Entity): a network node of an EPS network, which performs mobility management (MM) and session management (SM).

PDN-GW (Packet Data Network-Gateway)/PGW: a network node of an EPS network, which performs UE IP address allocation, packet screening and filtering, charging data collection, etc.

SGW (Serving Gateway): a network node of an EPS network, which performs mobility anchor, packet routing, idle-mode packet buffering, and triggering of an MME's UE paging.

NAS (Non-Access Stratum): an upper stratum of a control plane between a UE and an MME. This is a functional layer for transmitting and receiving a signaling and traffic message between a UE and a core network in an LTE/UMTS protocol stack, and supports mobility of a UE, and supports a session management procedure of establishing and maintaining IP connection between a UE and a PDN GW.

PDN (Packet Data Network): a network in which a server supporting a specific service (e.g., a Multimedia Messaging Service (MMS) server, a Wireless Application Protocol (WAP) server, etc.) is located.

PDN connection: a logical connection between a UE and a PDN, represented as one IP address (one IPv4 address and/or one IPv6 prefix).

RAN (Radio Access Network): a unit including a Node B, an eNode B, and a Radio Network Controller (RNC) for controlling the Node B and the eNode B in a 3GPP network, which is present between UEs and provides a connection to a core network.

HLR (Home Location Register)/HSS (Home Subscriber Server): a database having subscriber information in a 3GPP network. The HSS can perform functions such as configuration storage, identity management, and user state storage.

PLMN (Public Land Mobile Network): a network configured for the purpose of providing mobile communication services to individuals. This network can be configured per operator.

Proximity Services (or ProSe Service or Proximity-based Service): a service that enables discovery between physically proximate devices, and mutual direct communication/communication through a base station/communication through the third party. At this time, user plane data are exchanged through a direct data path without through a 3GPP core network (for example, EPC).

ProSe Communication: communication between two or more ProSe-enabled UEs in proximity by means of a ProSe Communication path. Unless explicitly stated otherwise, the term "ProSe Communication" refers to any/all of the following: ProSe E-UTRA Communication, ProSe-assisted WLAN direct communication between two UEs, ProSe Group Communication and ProSe Broadcast Communication.

ProSe E-UTRA Communication: ProSe Communication using a ProSe E-UTRA Communication path.

ProSe-assisted WLAN direct communication: ProSe Communication using a ProSe-assisted WLAN direct communication path.

ProSe Communication path: communication path supporting ProSe Communication. The ProSe E-UTRA Communication path could be established between the ProSe-enabled UEs using E-UTRA, or routed via local eNB(s). The ProSe-assisted WLAN direct communication path may be established directly between the ProSe-enabled UEs using WLAN.

EPC Path (or infrastructure data path): the user plane communication path through EPC.

ProSe Discovery: a process that identifies that a UE that is ProSe-enabled is in proximity of another, using E-UTRA.

ProSe Group Communication: one-to-many ProSe Communication, between more than two ProSe-enabled UEs in proximity, by means of a common communication path established between the ProSe-enabled UEs.

ProSe UE-to-Network Relay: is a form of relay in which a ProSe-enabled Public Safety UE acts as a communication relay between a ProSe-enabled Public Safety UE and the ProSe-enabled network using E-UTRA.

ProSe UE-to-UE Relay: is a form of relay in which a ProSe-enabled Public Safety UE acts as a ProSe Communication relay between two or more ProSe-enabled Public Safety UEs.

Remote UE: This is a Prose-enabled public safety UE connected to EPC through Prose UE-to-Network Relay without service from E-UTRAN in a UE-to-Network Relay operation, that is, Prose-enabled public safety UE configured to receive PDN connection, whereas this is a Prose-enabled public safety UE that performs communication with other Prose-enabled public safety UE through a Prose UE-to-UE Relay in a UE-to-UE relay operation.

ProSe-enabled Network: a network that supports ProSe Discovery, ProSe Communication and/or ProSe-assisted WLAN direct communication. Hereinafter, the ProSe-enabled Network may simply be referred to as a network.

ProSe-enabled UE: a UE that supports ProSe Discovery, ProSe Communication and/or ProSe-assisted WLAN direct communication. Hereinafter, the ProSe-enabled UE and the ProSe-enabled Public Safety UE may be referred to as UE.

Proximity: proximity is determined ("a UE is in proximity of another UE") when given proximity criteria are fulfilled. Proximity criteria can be different for discovery and communication.

SLP(SUPL Location Platform): entity that controls Location Service Management and Position Determination. The SLP includes SLC(SUPL Location Center) function and SPC(SUPL Positioning Center) function. Details of the SLP will be understood with reference to Open Mobile Alliance(OMA) standard document OMA AD SUPL: "Secure User Plane Location Architecture".

USD(User Service Description): application/service layer transmits USD, which includes TMGI(Temporary Mobile Group Identity) for each MBMS service, start and end time of session, frequencies, and MBMS service area identities(MBMS SAIs) information belonging to MBMS service area, to the UE. Details of the USD will be understood with reference to 3GPP TS 23.246.

ISR (Idle mode Signaling Reduction): When a UE frequently moves between E-UTRAN and UTRAN/GERAN, waste of network resources occurs due to a repeated position registration process. As a method for reducing such a waste, when the UE is in an idle mode, after position registration for MME and SGSN (hereinafter, these two nodes will be referred to as mobility management node) is performed through the E-UTRAN and the UTRAN/GERAN, a separate position registration is not performed in the case that movement between two RATs (Radio Access Technologies) which are already registered or cell reselection is performed. Therefore, if DL (downlink) data to the corresponding UE is arrived, paging is transmitted to the E-UTRAN and the UTRAN/GERAN at the same time to successfully discover the UE, whereby the DL data may be transferred to the discovered UE. [see 3GPP TS 23.401 and 3GPP TS 23.060]

Mission Critical Push To Talk: a group communication service that provides a fast establishment time, a capability capable of processing a large scaled group, powerful security, and priority handling.

Evolved Packet Core (EPC)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, in 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between an MME and an SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
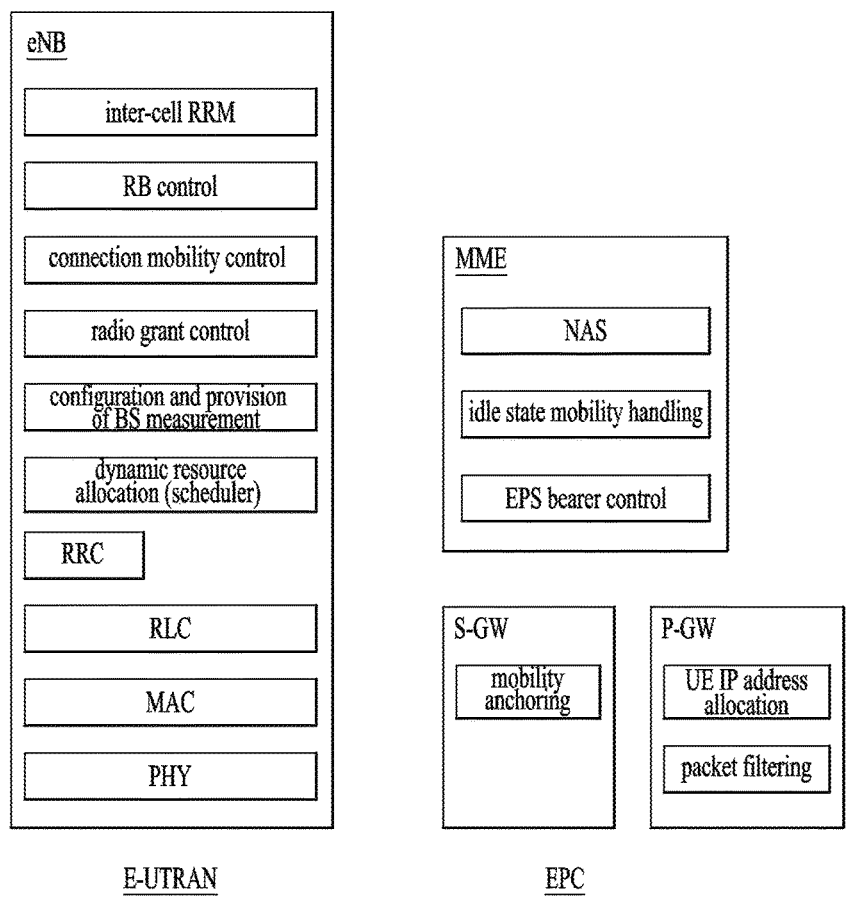
FIG. 2 is a diagram illustrating general architectures of E-UTRAN and EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
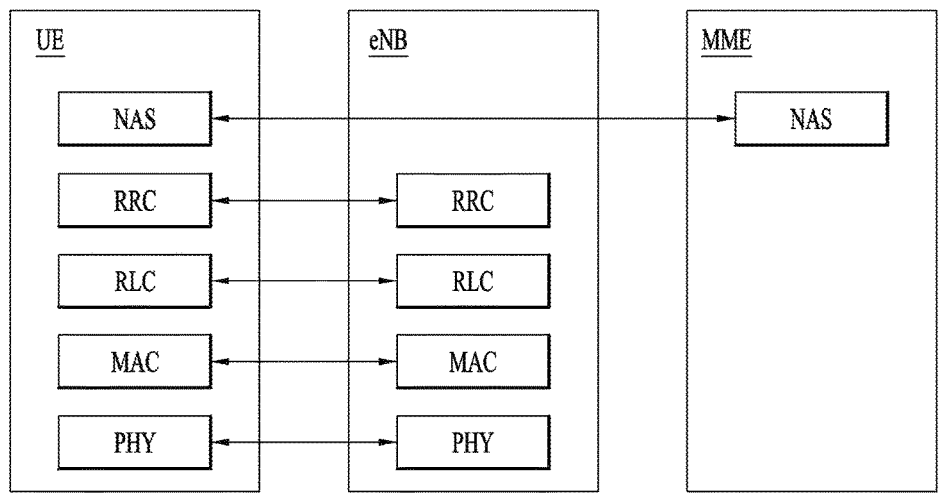
FIG. 3 is a diagram illustrating a structure of a radio interface protocol in a control plane.
Figure 4:
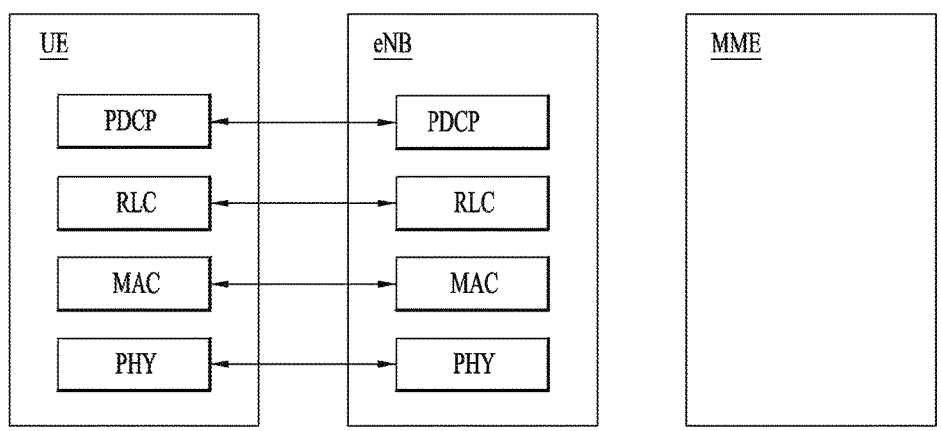
FIG. 4 is a diagram illustrating a structure of a radio interface protocol in a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel The physical channel layer is connected to a medium access control (MAC) layer, which is a higher layer of the physical layer, through a transport channel Data is transferred between the physical layer and the MAC layer through the transport channel Transfer of data between different physical layers, i.e., a physical layer of a transmitter and a physical layer of a receiver is performed through the physical channel The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers.

First, the MAC layer in the second layer serves to map various logical channels to various transport channels and also serves to map various logical channels to one transport channel The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The eSM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
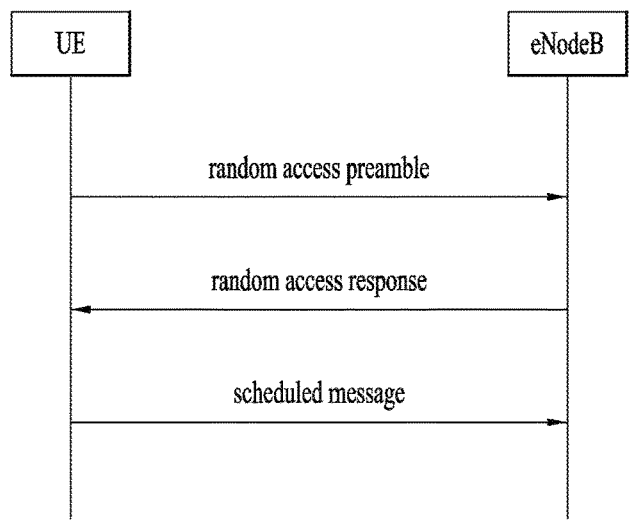
FIG. 5 is a flowchart for explaining a random access procedure.

FIG. 5 is a flowchart illustrating a random access procedure in 3GPP LTE.

The random access procedure is used for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
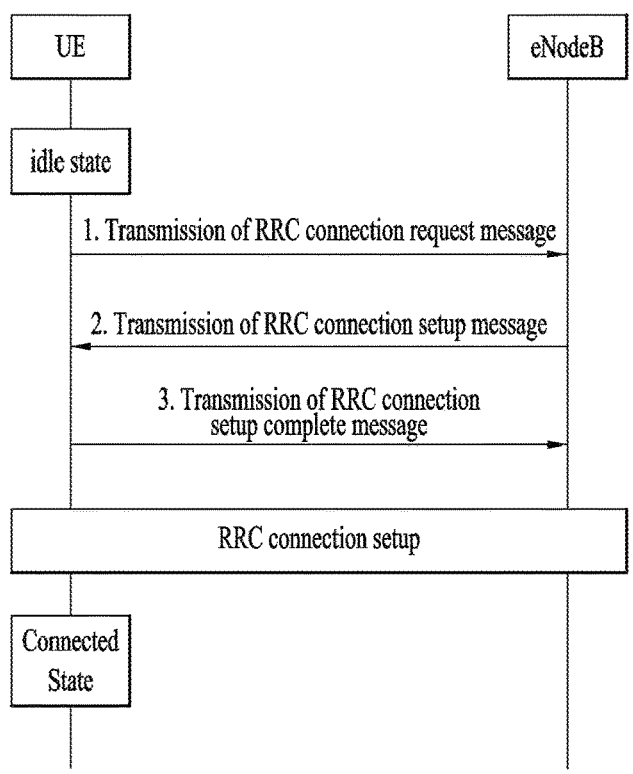
FIG. 6 is a flowchart illustrating a connection procedure in an RRC (radio resource control) layer.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, the UE establishes RRC connection with the RRC layer of the eNodeB through the RRC connection procedure and then performs transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

1) When the UE in the idle state desires to establish RRC connection for reasons such as an attempt to make a call, a data transmission attempt, or a response of the eNodeB to paging, the UE transmits an RRC connection request message to the eNodeB first.

2) Upon receiving the RRC connection request message from the UE, the ENB accepts the RRC connection request of the UE when the radio resources are sufficient, and then transmits an RRC connection setup message, which is a response message, to the UE.

3) Upon receiving the RRC connection setup message, the UE transmits an RRC connection setup complete message to the eNodeB. Only when the UE successfully transmits the RRC connection setup message, does the UE establish RRC conneciton with the eNodeB and transition to the RRC connected mode.

PSM (Power Saving Mode)

A power saving mode (PSM) corresponds to one of features used for an M2M UE and plays a role in minimizing power consumption of a UE by defining a period for disabling all access stratum operations of the UE such as paging reception, mobility management, and the like. In particular, when Attach and TAU (Tracking Area Update) are performed, a UE supporting the PSM may agree on active time and a periodic TAU timer (P-TAU timer) with a network (i.e., MME) or receive the active time and the periodic TAU timer from the network.

When the UE receives an attach accept message or an active time value included in a TAU accept message from the MME, if the UE is switched to ECM-IDLE (idle mode) from ECM-CONNECTED (connected mode), the UE maintains the ECM-IDLE during active time. In this case, the UE is able to receive a downlink packet or paging according to downlink signaling. Subsequently, if the active time is expired, the UE enters PSM and stops all access stratum operations.

When the UE enters an ECM-IDLE mode, the MME starts an active timer with an active time value. If the active timer is expired, the MME recognizes that the UE has entered the PSM and the MME clears a PPF (Packet Proceed Flag) (i.e., set to 0). By doing so, the MME considers that the UE is unreachable. In particular, the active time corresponds to time during which the ECM-IDLE (or RRC_IDLE) is maintianed before the UE enters the power saving mode.

If the periodic TAU timer is expired, the UE enables the access stratum operations again and performs TAU. Or, the UE may wake up at any time for uplink packet transmission, and the like. In particular, the UE is able to escape from the PSM. For details on the PSM, it may refer to 3GPP TS 23.682, TS 23.401.

Figure 7:
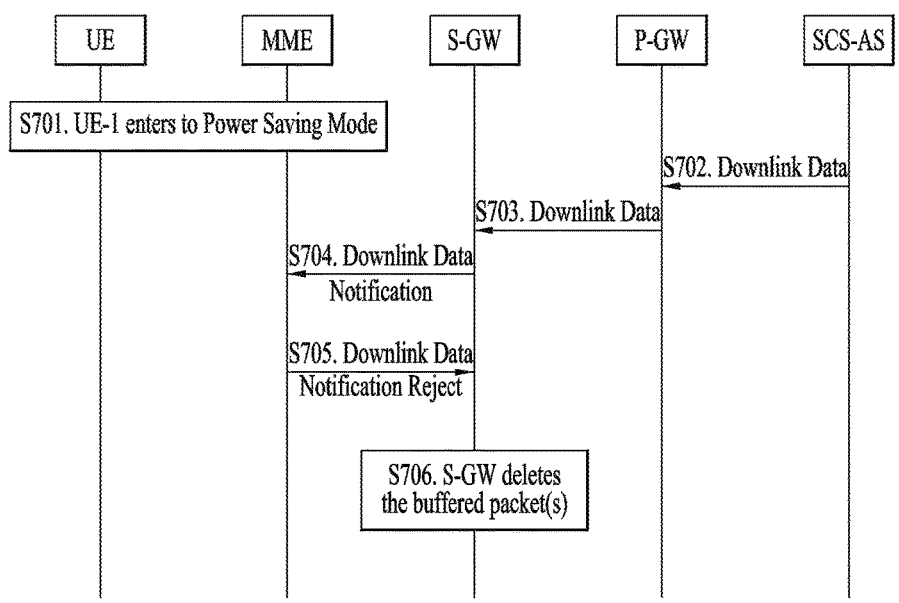
FIG. 7 is a flowchart for explaining an operation in a power saving mode according to a legacy technology.

FIG. 7 shows signaling of network nodes related to PSM. Referring to FIG. 7, in the step S701, a UE-1 enters a PSM. Subsequently, if an MME recognizes that the UE-1 has entered the PSM, the MME can clear a PPF (packet proceed flag) (i.e., PPF=0). In the step S702, if downlink data to be transmitted to the UE is generated, an M2M-related AS (applicaiton server) or an SCS (Service Capability Server) transmits the downlink data to a P-GW. In the step S703, the P-W transmits the received downlink data to an S-GW. In the step S704, when the S-GW receives the dowlink data from the P-GW, if there is no active S1-U connection of the UE (i.e., S1 bearer is released), the S-GW transmits a downlink data notification (DDN) message to the MME and buffers the received message. In the step S705, if the MME receives the DDN from the S-GW, the MME checks a PPF. Since the MME has cleared the PPF (PPF=0) in the step S701, the MME transmits a DDN reject message to the S-GW in response to the DDN received from the S-GW. The DDN reject message may include a reject cause (e.g., unable to page the UE). In the step S706, having received the DDN reject message, the S-GW deletes/discards the stored downlink data.

When a UE is in an idle mode, if a packet to be transmitted to the UE is generated, the packet is transmitetd to the UE after paging is performed. On the contrary, when the UE is a PSM state, if a packet to be transmitted to the UE is generated, the packet is discarded without performing paging. Specifically, if the UE is in the PSM state, the MME clears a PPF (paging proceeded flag) for the UE. Having received the packet to be transmitted to the UE, the S-GW transmits a downlink data notificaton message corresponding to a message for requesting paging to the MME. However, the MME transmits a downlink data notification reject message to the S-GW without performing paging. Having received the downlink data notification reject message from the MME, the S-GW discards the packet to be transmitted to the UE.

When it is unable to transmit a packet to the UE in the PSM state, if the P-GW receives the packet heading to the UE, the P-GW transmits the packet to the S-GW. The S-GW stores the packet in a buffer and transmits a downlink data notification message to the MME to request paging. The MME transmits a downlink data notification reject message to the S-GW to reject the request of the S-GW. As a result, a problem of wasting a resource for exchanging an unnecessary message/signaling occurs in a core network section. In particular, since the PSM corresponds to a function standardized in consideration of an M2M (machin-to-machine) UE or an MTC (machin-type communications) UE, if the unnecessary message/signaling is exchnaged by a plurality of MTC UEs, it may have a bad influence on overall performance of a mobile communication network.

In order to solve the problem above, a method of processing data for a UE in PSM is explained in the following. In the following description, an operation of a PGW is mainly explained first and then signaling between network nodes is explained with reference to FIG. 8.

Data Processing for UE in PSM

According to embodiments of the present invention, if a PGW receives a message related to a PDN connection pause request and a downlink data to be transmitted to a UE, the PGW can perform one operation selected from the group consisting of transmission, deletion, and storage of the downlink data based on the message related to the PDN connection pause request.

Specifically, the PGW can determine whether or not the UE is in PSM based on the message related to the PDN connection pause request related to the UE. If it is determined as the UE is in the PSM, the PGW can delete the downlink data. As mentioned in the foregoing description, if the UE is the PSM, the S-GW discards a packet because the MME does not perform paging. Hence, if the PGW transmits the downlink data to be transmitted to the UE to the S-GW, it could be resource waste only resulted from exchnaging an unnecessary message/signaling. Hence, if the UE is in the PSM, it is necessary for the PGW to delete the downlink data to prevent unnecessary signaling and resource waste.

If the UE is in the PSM and PSM termiantion of the UE is smaller than a predetermined value, the PGW can store the downlink data based on the the message related to the PDN connection pause request related to the UE. In particular, if it is recognized as the UE is going to escape from the PSM soon or later (e.g., if the remaining time until the UE escapes from the PSM is equal to or less than time set to the P-GW in advance), the PGW may store the received data rather than deletes the data. In this case, the PGW can transmit the downlink date at the timing at which the PSM is terminated. In particular, if it is recognized as the UE-1 is escaped from the PSM, the P-GW can transmit the stored data to the S-GW.

The message related to the PDN conenction pause request can include at least one of PSM initiation time and PSM maintenance time. And, the message related to the PDN conenction pause request related to the UE can be transmitted by the MME when the UE is switched to an idle mode (when an active timer starts by an active time value). As mentioned in the following description, the MME may assign active time to the UE and the active time can be included in a TAU accept transmitted to the UE by the MME.

When the PSM of the UE is terminated, if an uplink packet is generated or a paused PDN connection-related message is received, the PGW can transmit the downlink data irrespective of the message related to the PDN connection pause request. In particualr, if a PDN connection pause is cancelled, the PGW transmits a downlink packet to the UE. In this case, the PDN connection-related message may correspond to one selected from the group consisting of a modify bearer request, a bearer resource command, and a modify bearer command And, the PDN connection-related message may not include a PDN connection cancellation-related message and a UE detach-related message. The aforementioned cases can be comprehended as a case that the UE is in a connected mode or a case that the UE is reachable. In other word, the P-GW can recognize that the UE is able to receive a packet based on the aforementioned case. When the PSM UE is in a connected mode or is reachable, the MME and/or the S-GW can additionally transmit a message for explicitly notifying the status of the UE to the P-GW while performing a legacy operation/ procedure or when the legacy operation/procedure is terminated.

Figure 8:
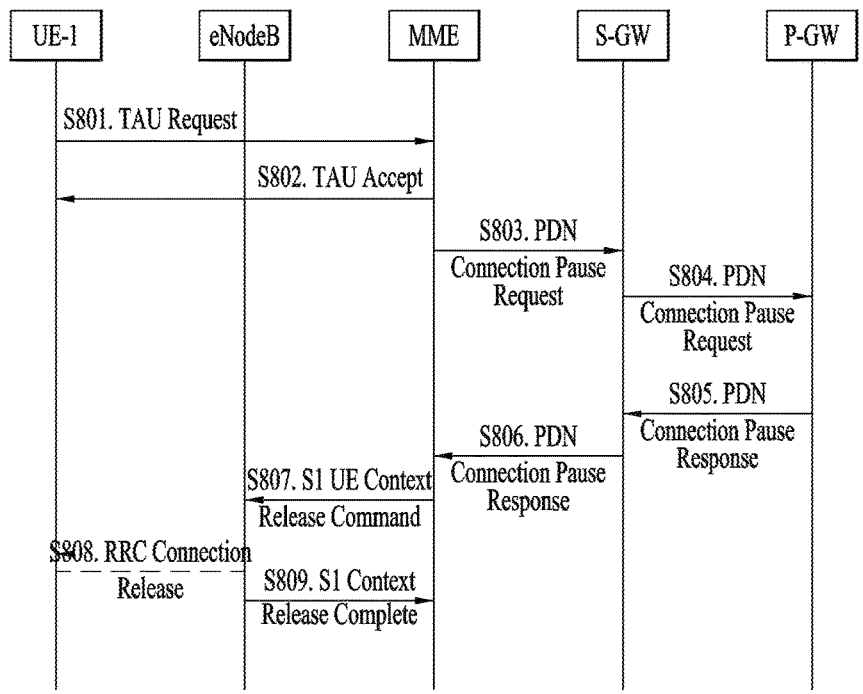
FIG. 8 is a flowchart for explaining one embodiment of the present invention.

Meanwhile, the P-GW can recognize that the UE-1 uses PSM (the UE-1 enters the PSM) via the procedure shown in FIG. 8. And, the P-GW can determine timing of entering the PSM and duration of maintianing the PSM of the UE-1 based on information included in the PDN connection pause request message transmitted by the MME. In the following, FIG. 8 is explained in detail.

In the step S801, the UE-1 performs TAU request. In this case, in order for the UE-1 to use PSM, the UE-1 includes informaiton indicating the PSM in a TAU request message and transmits the information to the MME. In particular, the UE-1 includes active time information in the TAU request message.

In the step S802, the MME determines to permit the UE-1 to use the PSM and transmits a TAU accept message including active time assinged to the UE-1 to the UE-1.

In the step S803, the MME determines to switch the UE-1 to an idle mode after a TAU procedure is completed. Subsequently, the MME transmits a PDN connection pause request message (e.g., a message for requesting a PDN connection pause) to the S-GW. In this case, the MME may use a legacy message (e.g., release access bearers request) or a newly defined message. The MME can transmit a PDN connection pause request message for a PSM UE to the S-GW while performing an S1 release procedure or after the S1 release procedure is completed. Having received the PDN connection pause request message, the S-GW can transmit the request to the P-GW. A legacy message can be used for the request message and information for requesting PDN connection pause can be included in the request message. A newly defined message can be used for the request message as well. As an example of using the legacy message, in 3GPP TS 23.401 S1 release procedure, when the MME transmits a release access bearers request message to the S-GW, the PDN connection pause request information can be included in the release access bearers request message. Having received the release access bearers request message, the S-GW can transmit a PDN connection pause request message to the P-GW based on the PDN connection pause request information. When the PDN connection pause request is transmitted, the MME can include time at which pause is initiated (relative time and absolute time) and time for which the pause is maintained in the PDN connection pause request. For example, the time at which the pause is initiated can be configured by PSM-related active time. In this case, the P-GW can initiate the PDN connection pause after active time elapsed from timing at which the PDN connection request is received. Subsequently, while the pause is maintained, the PDN connection pause is maintained. For example, the time for which the pause is maintained can be configured by remaining time until the UE performs a next TAU after the UE is in PSM state or time less than the remaining time. This is an example only. The MME can appropriately configure and include the time at which the pause is initiated and the time for which the pause is maintained in the PDN connection pause request.

Subsequently, in the step S804, the S-GW transmits the received PDN connection pause request message to the P-GW. If the request message corresponds to an S1 release-related legacy message (e.g., release access bearers request), a corresponding operation can be perfomred. For details, it may refer to 3GPP TS 23.401.

In the step S805, having received the PDN connection pause request message, the P-GW transmits a response to the S-GW in response to the PDN connection pause request message. In the step S806, the S-GW transmits a PDN connection pause response message to the MME. In the step S802, the MME transmits an S1 UE context release command message to an eNode B to release S1. The step 807 can be performed prior to the step S803 or can be performed in parallel.

In the step S808, if RRC connection is not released yet, the eNode B transmits an RRC connection release message to the UE-1. If the UE-1 acknowledges the RRC connection release message, the eNode B deletes context for the UE-1.

In the step S809, the eNode B transmits an S1 UE context release complete message to the MME to confirm S1 release. The step S809 can be performed immeditely after the step S807.

In the foregoing description, although it is explained as the total PDN connections are paused, it may be able to pause a specific bearer(s) only. And, although an S1 release-related operation of each network node is not explicitly described in the foregoing description, it may refer to 3GPP TS 23.401 for the S1 release-related operation. And, although the aforementioned description is mainly focused on the MME, the present invention can be identically applied to a case that an access network corresponds to UTRAN or GERAN. In this case, a role of the MME can be performed by an SGSN.

Figure 9:
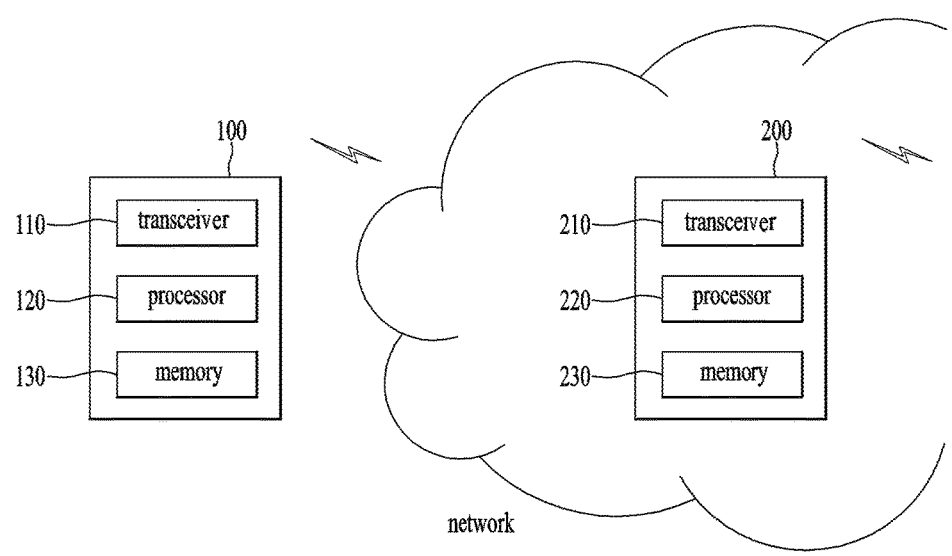
FIG. 9 is a diagram illustrating a configuration of a node according to embodiment of the present invention.

FIG. 9 is a diagram illustrating configurations of a UE and a network node apparatus according to the preferred embodiment of the present invention.

Referring to FIG. 9, a UE 100 according to the present invention may include a transceiving module 110, a processor 120 and a memory 130. The transceiving module 110 may be configured to transmit various signals, data and information to an external device and receive various signals, data and information from the external device. The UE 100 may be connected with the external device through the wire and/or wireless. The processor 120 may control the overall operation of the UE 100, and may be configured to perform a function of operation-processing information to be transmitted to and received from the external device. Also, the processor 120 may be configured to perform a UE operation suggested in the present invention. The memory 130 may store the operation-processed information for a predetermined time, and may be replaced with a buffer (not shown).

Referring to FIG. 9, the network node apparatus 200 according to the present invention may include a transceiving module 210, a processor 220, and a memory 230. The transceiving module 210 may be configured to transmit various signals, data and information to an external device and to receive various signals, data and information from the external device. The network node apparatus 200 may be connected with the external device through the wire and/or wireless. The processor 220 may control the overall operation of the network node apparatus 200, and may be configured to perform a function of operation-processing information to be transmitted to and received from the external device. Also, the processor 220 may be configured to perform a network node operation suggested in the present invention. The memory 230 may store the operation-processed information for a predetermined time, and may be replaced with a buffer (not shown).

Also, the details of the aforementioned UE 100 and the aforementioned network node apparatus 200 may be configured in such a manner that the aforementioned various embodiments of the present invention may independently be applied to the aforementioned UE 100 and the aforementioned network node apparatus 200, or two or more embodiments may simultaneously be applied to the aforementioned UE 100 and the aforementioned network node apparatus 200, and repeated description will be omitted for clarification.

The aforementioned embodiments according to the present invention may be implemented by various means, for example, hardware, firmware, software, or their combination.

If the embodiments according to the present invention are implemented by hardware, the method according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiments according to the present invention are implemented by firmware or software, the method according to the embodiments of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is also obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

Although the aforementioned various embodiments of the present invention have been described based on the 3GPP system, the aforementioned embodiments may equally be applied to various mobile communication systems.

What is claimed is:

1. A method for a PGW (packet data network-gateway) to process data for a user equipment (UE) in a PSM (power saving mode) in a wireless communication system, the method comprising:
   receiving, by the PGW, a message related to a PDN connection pause request including information related to a PSM duration of the UE; and
   receiving, by the PGW, downlink data to be transmitted to the UE,
   wherein the PGW deletes the downlink data, to be transmitted to the UE, when a time remaining until an end of the PSM duration is shorter than a predetermined time, and
   wherein the PGW stores the downlink data, to be transmitted to the UE, when the time remaining until the end of the PSM duration is longer than a predetermined time.

2. The method of claim 1, wherein the message related to the PDN connection pause request is transmitted from an mobile management entity (MME), when the UE is switched to an idle mode.

3. The method of claim 1, wherein the message related to the PDN connection pause request is transmitted from an MME, when an active timer starts by a value of an active time of the UE.

4. The method of claim 3, wherein the active time corresponds to a time maintained by the UE in idle mode.

5. The method of claim 3, wherein the active time is allocated to the UE by the MME.

6. The method of claim 5, wherein the active time is contained in a TAU accept message, which is transmitted to the UE by the MME.

7. The method of claim 1, wherein when the PSM of the UE is terminated, an uplink packet is generated, or a paused PDN connection-related message is received, wherein the PGW transmits the downlink data irrespective of the PDN connection pause request.

8. The method of claim 7, wherein the PDN connection-related message corresponds to one selected from a group consisting of a modify bearer request, a bearer resource command, and a modify bearer command.

9. The method of claim 8, wherein the PDN connection-related message does not comprise a PDN connection release-related message and a UE detach-related message.

10. A PGW (packet data network-gateway) processing data for a user equipment (UE) in a PSM (power saving mode) in a wireless communication system, the PGW comprising:
   a transceiver; and
   a processor, operatively coupled to the transceiver, wherein the processor is configured to:
   control the transceiver to receive a message related to a PDN connection pause request including information related to a PSM duration of the UE; and
   control the transceiver to receive downlink data to be transmitted to the UE, wherein the PGW deletes the downlink data, to be transmitted to the UE, when a time remaining until an end of the PSM duration is shorter than a predetermined time, and
   wherein the PGW stores the downlink data, to be transmitted to the UE, when the time remaining until the end of the PSM duration is longer than a predetermined time.

* * * * *